(12) United States Patent
Asplund

(10) Patent No.: US 8,851,252 B2
(45) Date of Patent: Oct. 7, 2014

(54) SYSTEM ADAPTED FOR ONE OR MORE ELECTRICALLY PROPELLABLE VEHICLES (CLEANSING MEANS)

(75) Inventor: Gunnar Asplund, Solna (SE)

(73) Assignee: Elways AB, Solna (SE)

( * ) Notice: Subject to any disclaimer, the term of this patent is extended or adjusted under 35 U.S.C. 154(b) by 86 days.

(21) Appl. No.: 13/638,605

(22) PCT Filed: Mar. 31, 2011

(86) PCT No.: PCT/SE2011/050379
§ 371 (c)(1),
(2), (4) Date: Sep. 30, 2012

(87) PCT Pub. No.: WO2011/123048
PCT Pub. Date: Oct. 6, 2011

(65) Prior Publication Data
US 2013/0025991 A1    Jan. 31, 2013

(30) Foreign Application Priority Data

Apr. 1, 2010 (SE) ..................... 1000325

(51) Int. Cl.
| B60M 1/30 | (2006.01) |
| B60M 1/36 | (2006.01) |
| B60L 11/18 | (2006.01) |
| B60L 5/40 | (2006.01) |
| B60M 7/00 | (2006.01) |
| E01H 8/12 | (2006.01) |

(52) U.S. Cl.
CPC . *B60M 1/36* (2013.01); *Y02T 90/14* (2013.01); *Y02T 10/7088* (2013.01); *Y02T 10/646* (2013.01); *B60L 11/1809* (2013.01); *B60L 5/40* (2013.01); *Y02T 10/648* (2013.01); *B60M 7/003* (2013.01); *E01H 8/12* (2013.01); *B60L 2200/26* (2013.01); *Y02T 10/7005* (2013.01)
USPC .......................... 191/22 C; 191/10

(58) Field of Classification Search
USPC .......... 191/2, 3, 14, 22 R–25, 22 C; 104/139, 104/140, 142, 146
See application file for complete search history.

(56) References Cited

U.S. PATENT DOCUMENTS

| 3,637,956 A | * | 1/1972 | Blackman ........................ 191/4 |
| 3,914,562 A | * | 10/1975 | Bolger ............................. 191/10 |
| 4,007,817 A | * | 2/1977 | Bolger, Jr. ....................... 191/10 |
| 4,129,203 A | * | 12/1978 | Berman ........................... 191/48 |
| 4,139,071 A | * | 2/1979 | Tackett .......................... 180/165 |
| 4,476,947 A | * | 10/1984 | Rynbrandt ..................... 180/2.1 |
| 5,464,082 A | * | 11/1995 | Young .............................. 191/2 |
| 5,960,717 A | * | 10/1999 | Andre ............................ 104/139 |
| 6,240,852 B1 | * | 6/2001 | Camp ............................ 104/140 |
| 8,365,888 B2 | * | 2/2013 | Re Fiorentin et al. .......... 191/13 |
| 2007/0278059 A1 | * | 12/2007 | Afriat ........................ 191/29 R |
| 2011/0106349 A1 | * | 5/2011 | Sakita ............................ 701/22 |
| 2011/0153184 A1 | * | 6/2011 | Suh ............................... 701/117 |
| 2011/0266108 A1 | * | 11/2011 | Kitaguchi ....................... 191/22 |
| 2012/0067684 A1 | * | 3/2012 | Asplund ......................... 191/22 |
| 2013/0025168 A1 | * | 1/2013 | Asplund ......................... 37/207 |
| 2013/0025990 A1 | * | 1/2013 | Asplund ......................... 191/22 |
| 2013/0025991 A1 | * | 1/2013 | Asplund ......................... 191/22 |
| 2013/0025992 A1 | * | 1/2013 | Asplund ......................... 191/22 |
| 2013/0037367 A1 | * | 2/2013 | Aguilar .......................... 191/22 |

FOREIGN PATENT DOCUMENTS

| DE | 72443 C | 6/1893 |
| EP | 0151982 A2 | 8/1985 |
| EP | 0505845 A1 | 9/1992 |
| FR | 975255 A | 3/1951 |
| KR | 100884188 B1 | 8/2005 |
| WO | 9310995 A1 | 6/1993 |

OTHER PUBLICATIONS

Notification of Transmittal of the International Search Report and the Written Opinion of the International Searching Authority, or the Declaration issued on Jun. 27, 2011 by the SE International Searching Authority in International Application No. PCT/SE2011/050379.

* cited by examiner

*Primary Examiner* — Jason C Smith
(74) *Attorney, Agent, or Firm* — Raymond R. Ferrera; Adams and Reese LLP

(57) ABSTRACT

A cleaning means related to a vehicle-related system for driving an electrically propellable vehicle along a roadway. The vehicle has three sources of power: a vehicle-related power generator, a set of batteries and vehicle-external electric stations. The vehicle is provided with a current collector which is displaceable up and down and sideways in relation to the direction of transportation, in order to be brought into mechanical and electrical contact with elongated tracks positioned below the roadway and comprising a conductor adapted to be connected with an electric station. The cleaning means is rotatably fastened in an upper area thereof about a horizontally oriented axis of rotation and adapted to clean the track from loose obstacles and/or yield to solid obstacles. The cleaning means and the axis of rotation are movably disposed in vertical direction by means of a resilient member. The cleaning comprises a forwardly directed edge portion oriented in the direction of travel, the edge portion comprising a point which may be brought into contact with the track and the conductor.

18 Claims, 5 Drawing Sheets

Figure 1A:
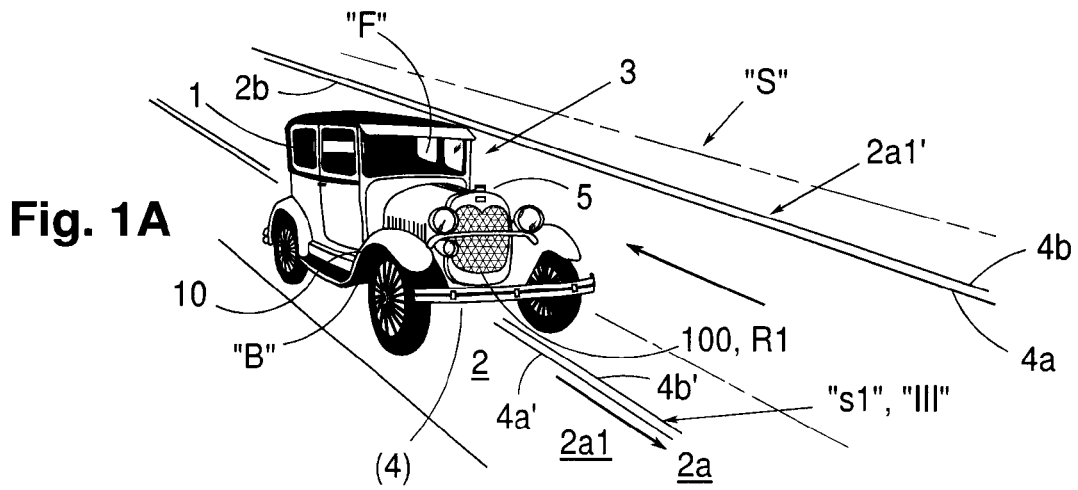

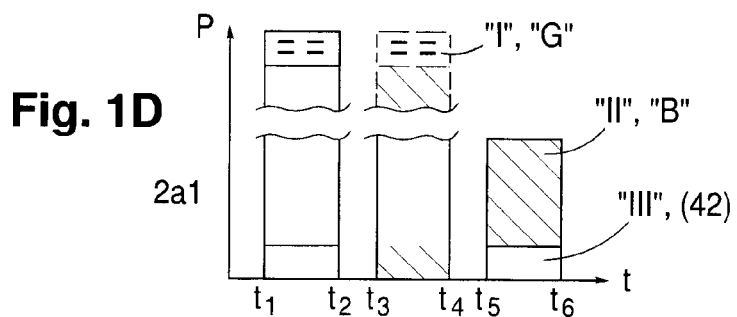
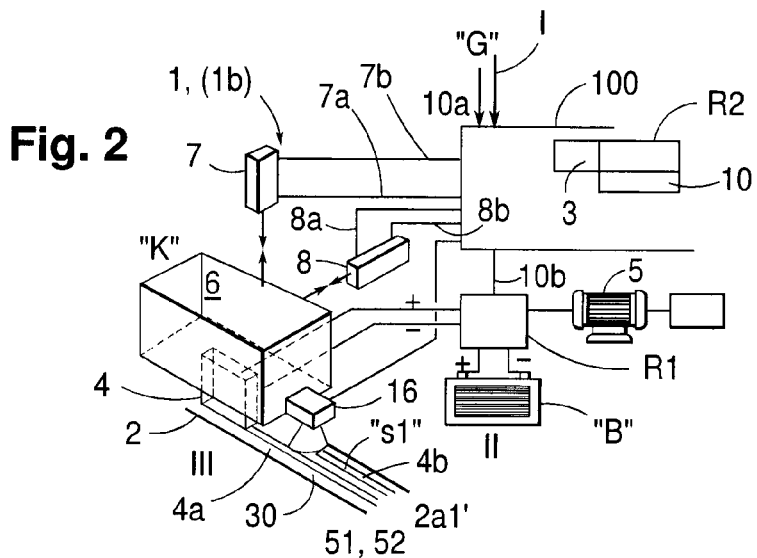
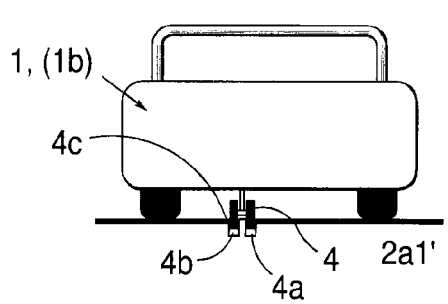
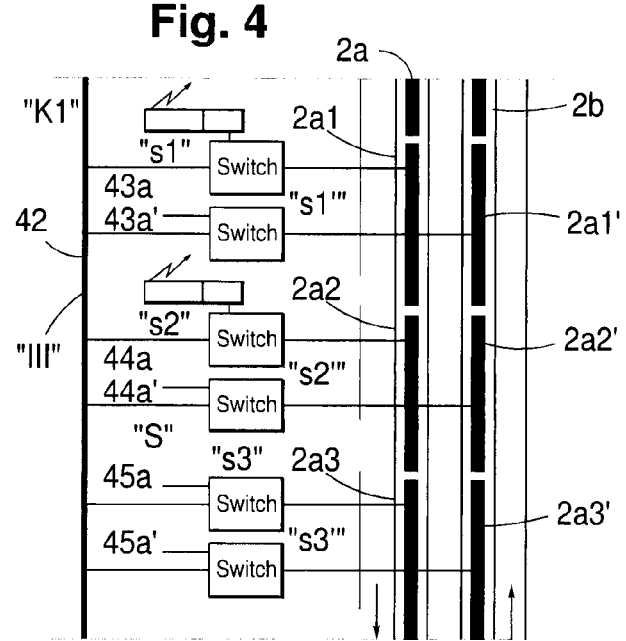

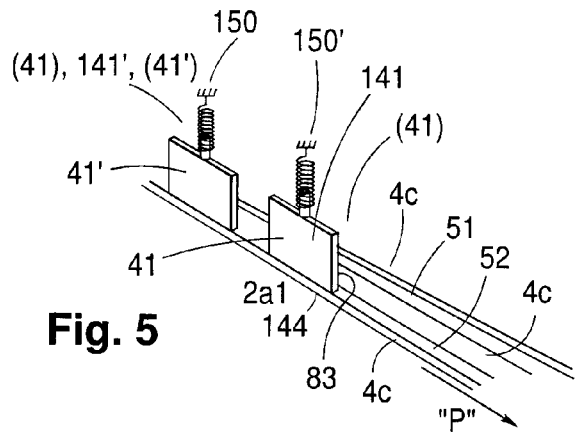
Fig. 5
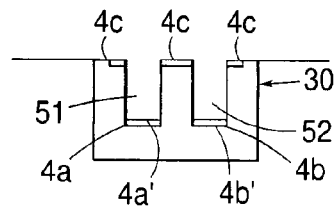
Fig. 6
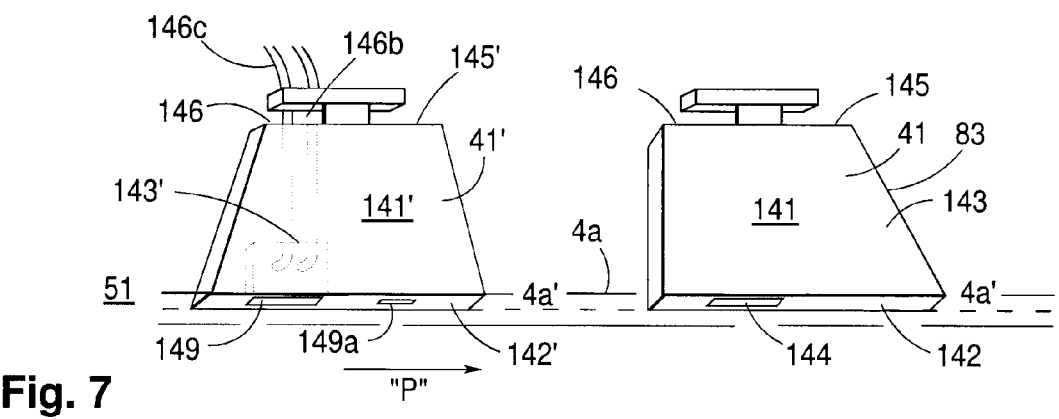
Fig. 7
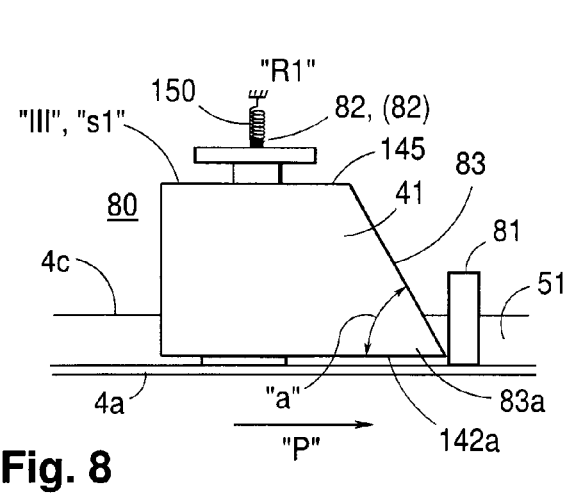
Fig. 8
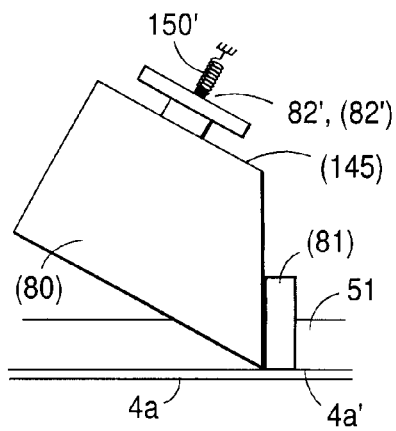

SYSTEM ADAPTED FOR ONE OR MORE ELECTRICALLY PROPELLABLE VEHICLES (CLEANSING MEANS)

TECHNICAL FIELD OF THE INVENTION

This invention refers generally to an arrangement related to vehicles, specifically to such arrangement which is adapted to be able to clean or cleansing a track, in the form of grooves and/or conductor surfaces from water, sand and other particles and to an arrangement to elevate and lower a contact means and/or a contact device such as a current collector, with each vehicle being adapted to a system appropriate for electrically propellable vehicles and more particularly to such system in which i.a. one or more batteries and/or a set of batteries for power adaptation and energy storage are intended for being able to propel the vehicle rolling along a stretch of a roadway.

Systems of this type are based on utilizing a specifically designed stretch of the road or roadway wherein the upper surface of this stretch of the roadway exhibits at least one track, in the form of a groove, and in which track two or more parallel electric conductors or strips with a conductor surface which may be placed under power or voltage are disposed and which preferably are provided with uncovered and uninsulated contact surface sections.

In accordance with the instructions of the present invention such system is to comprise; "a" a plurality of roadway sections or portions subdividing the total stretch of the roadway and each allotted to one or more electrically conductive surfaces, such as conductors or strips, said roadway portions being connectable over a switch to one or more stationary electric stations serving as a source of power or energy external to vehicles so as thereof i.a. to charge batteries belonging to vehicles and/or sets of batteries intended primarily to propel the vehicle by means of said set of batteries along the stretch of the roadway and its roadway sections or portions and "b" one or more, over an individual electric motor or a plurality of motors, propellable vehicles, wherein each of said vehicles is to exhibit a control circuit, controlling the power so as to create a chosen and required propelling effect and/or a speed adaptation and/or control.

The invention is to be applied to stretches of roadways in the form of public and private roads and along their road sections or portions but can also find use in industrial systems having different requirements of power and energy.

The invention has the purpose i.a. of concurrently with power charging of the set of batteries from the external source of energy supplying the power and the energy which will be required for a chosen power requirement for driving the vehicle upwards and over an upwardly rising portion of the roadway.

More particularly the present invention refers to such system in which a non-railbound vehicle, such as a freight vehicle, while being driven along chosen roadway sections or portions by means of the set of batteries allotted to the vehicle, can be supplied with supplementary power and energy, such as from the external source of power or alternatively from a source of power related to the vehicle, such as a diesel generator.

In this regard the present invention proposes a "first" source of power related to the vehicle, such as a diesel generator, a "second" source of power related to the vehicle, such as a battery set, and a "third" source of power separated from the vehicle and being disposed externally, such as two or more conductor surfaces, such as conductors or strips which may be placed under power and be included in tracks or grooves in successive roadway sections or portions with the conductors of a chosen roadway section being electrically insulated from corresponding conductors in an adjacent (preceding or succeeding) roadway section or portion.

The present invention is based on having two or more conductors built into one track or into individual tracks or grooves in their respective roadway sections or portions, with said tracks (not the conductors) extending continually from roadway section or portion to roadway section or portion.

The voltage which is allotted to these conductors can be an alternating voltage (AC-power) (with a vehicle-related rectifier) or a direct voltage (DC-power). In choosing a DC-power one of the conductors can be positive, whereas the other conductor can be negative and an additional conductor can be allotted ground potential or zero potential, with the vehicle being operated at twice the value of the voltage.

With alternating voltage to the conductor of the roadway sections said voltage can to advantage be disposed in anti-phase and symmetrically around a ground potential or zero potential.

The motor intended for driving the vehicle can be of the DC-power type or of the AC-power type, with a converter being connected prior to the motor in the latter case.

BACKGROUND OF THE INVENTION

Methods, arrangements, and structures related to the technical field and character mentioned above are known earlier in a number of different embodiments.

With regard to electrically propellable vehicles, the latter can to advantage be categorized as "railbound vehicles" or as "non-railbound vehicles".

"Railbound vehicles" are driven along their stretch of the roadway and roadway sections on parallel rails disposed in their stretch of the roadway or on parallel rails laid open by sleepers or the like and guiding the fixed pairs of wheels of the vehicle.

"Non-railbound vehicles" are conveyed along their stretch of the roadway and roadway sections or portions over a road and are driven along the roadway sections or portions by steering control equipment associated with the vehicle.

The present invention is based on and is intended to be used in the latter category and technology and is intended to be applied primarily to heavy trucks with or without connected trailers, wherein from U.S. Pat. No. 4,129,203-A a vehicle-related arrangement is known for letting contact springs disposed beneath the vehicle be brought upwards and downwards and sideways towards and to mechanical and electrical cooperation with or away from cooperation with non-insulated surface sections of the electric conductors (14) subject to voltage and associated with each roadway section or portion.

Utilizing an insulator (16) in a channel (18) which supports the conductors in the form of rails (14) is indicated here. A cover plate (20) provided with a slit (12) is removably attached to the upper and opposing wall portions of the channel (18), with this cover plate (20) being adjusted to a plane connecting to the upper surface (22) of the roadway section or portion.

FIGS. 2 and 3, respectively, in the mentioned Patent Publication describe a vehicle-related table (98), to which an arm (10) is rotatably attached (94, 96, 99). Sensors (30) allotted to the table (98) generate signals which with regard to their phase and magnitude indicate the direction to and distance from an axis (99) of rotation to a slit (12) in the cover plate (20), which is based on changes in a generated magnetic field.

The table (98) and arm (10) can be driven over a designated mechanism (31) by a motor (32) between predetermined limits and limit switches (40, 41) positioned there.

Patent publication WO 93/10995-A discloses an earlier known system for driving electrically controllable vehicles along a road and its roadway sections or portions.

Figure 9:
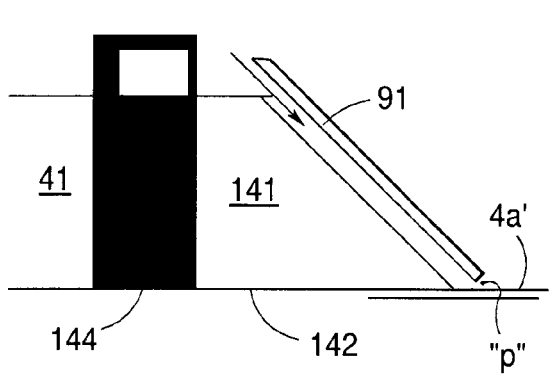

FIG. 9 in the mentioned patent publication clarifies the basic structure of the system.

It is instructed here that the extension (14) of the roadway and its roadway portions are to be provided with electrically conductive road sections (300a-300f), wherein a roadway section may be considered to correspond to a roadway portion.

The vehicle (310) has an electric motor (320) and two (312, 314) or three (312, 312' and 314, respectively) contact springs lying therebelow and being adapted for mechanical and electrical contact with the electrically conductive conductors, whose lengths are adapted to correspond to a chosen length (identically equal lengths) for utilized roadway sections or portions.

The electrically conductive conductors in the road sections (300a-399f) are disposed after each other with an intermediately oriented free space (302a-302e) so as thereby to prevent short-circuits in consequence of dragging contact springs (312, 312', 314).

Every other road section (300b, 300d, 300f) is here connected continually to a reference voltage (ground potential), whereas the remaining road sections (300a, 300c, and 300e, respectively) are either directly connectable to a source (440) of DC-voltage or can be connected over a connecting means (304a, 304b, 304c) to any appropriate electric power source (308) when a vehicle is in the vicinity.

When an embodiment having three contact springs is to be utilized the distance between them is to be chosen such, that two or three contacts always are in electric contact with two road sections exhibiting opposite polarities and that neither of the two contacts is to be able to short-circuit the open space (302a-302e) between two adjacently positioned sections or portions.

For its function the system here requires specially structured vehicles (310), wherein the chosen distance between front (314) and rear (312, 312') contacts is to be identical and furthermore to be chosen somewhat greater than the equal lengths of the roadway sections (300b, 300d).

Thus, specially structured vehicles with front and rear contacts are required and in which each one of the utilized road sections (300a-300f) is to be chosen having equal lengths and they are to be positioned behind each other in the direction of motion of the vehicle with equal mutual free and intermediately lying spaces (302a-302e).

The remainder of the Patent Publication shows the existence of a single conductor or rail subjected to voltage in a road section (Page 5, lines 11-13) and that a vehicle is to attract a voltage to a roadway section lying in front (Page 5, lines 19-21; page 6, lines 7-10; page 8, lines 28-32, respectively).

Furthermore it is indicated that bars or rails (16), which may be subjected to voltage, can be provided with side-positioned drainage tracks (page 9, lines 1-4).

Lack (or presence) of an activating signal is to be able to influence a control unit (38) (Page 8, lines 23-27, respectively).

The necessary distance between vehicle-associated contacts is disclosed in lines 17-20 of page 10, and utilizing activity-initiated radio signals is suggested in lines 2-4 of page 11 and lines 1-16 of page 14, respectively.

Furthermore, in lines 21-23 of page 15 and lines 1-15 of page 16, utilizing a Hall element (240) and connecting it to an amplifier (246) is suggested. Furthermore, alternatives thereof are illustrated in lines 3-9 of page 17.

It is also known to have a vehicle driven electrically along a stretch of roadway by means of inductive transfer of energy active between a vehicle and a roadway section and a road portion laying therebelow.

As examples of this known technology reference is also made to the contents of U.S. Pat. No. 3,914,562-A and U.S. Pat. No. 4,007,817-A, respectively.

Patent publication WO 2007/056 804 A1 describes and discloses a plurality of means, devices and/or arrangements, which have relevance when evaluating the significant features related to the prior art and also to the present invention. However, these means, devices and/or arrangements are only mentioned in general terms, and only a few or no suggested structure is disclosed.

The contents of this patent publication will be described in the following and coordinated in the following subsections;

a. Pairs of electrically conductive contacts or strips oriented along a roadway.
b. Switching means to supply DC power to a roadway related pair of electrically conductive contacts or strips. (DC network).
c. Vehicle related transmitter.
d. Vehicle related pick-up arms.
e. DC-voltage difference between roadway related conductors, contacts or strips.
f. Orientation of the roadway related conductive strips.
g. Power supply system.
h. Detector means or arrangement.
i. Power supply to an adjacent pair of conducting strips.
j. Sensor arrangement.
k. Conditions for activating switching means.
l. Battery arrangements.
m. On-board charging engine.
n. Overload cut-off and re-close switch.
o. Safe conditions of bare electric roadway related electric conductors or strips.
p. Use of DC voltage or AC voltage to supply power to the roadway related electric conductors or strips.
q. Magnetic field sensor.
r. Snow plough and blower arrangements.
s. Electrical heating tape.

a. Pairs of Electrically Conductive Conductors or Strips Oriented Along a Roadway.

It is suggested in the above-mentioned International Patent Publication that each pair of electrically conductive strips (members) be electrically insulated from an adjacent and another pair of electrically conductive strips, and wherein a vehicle traveling along said roadway travels over a first pair of electrically conductive strips and then travels over a next adjacent pair of electrically conductive strips and so forth.

b. Switching Means to Supply DC Power to a Roadway Related Pair of Electrically Conductive Contacts or Strips (DC-Network).

A source of direct current electricity (DC-network) is arranged to provide a DC power to the roadway related pairs of electrically conductive strips (members).

Switching means are operative to supply DC power to a pair of electrically conductive strips when a vehicle travels over that pair, said switching means being operative to turn off the supply of DC power to a pair of electrically conductive strips when no vehicle travels over and along that pair of electrically conductive strips.

This improves the safety of the system as suggested (page 2, lines 13-17) in that switching means are operative to supply DC power to said pair of electrically conductive strips (members) only when a vehicle travels over that pair, the switching means being operative to turn off the supply of DC power to a pair of electrically conductive strips when no vehicle travels over that pair of electrically conductive strips.

Said Patent Publication further mentions (page 1, lines 7-21) a prior art system for the universal use of electrically powered roadway vehicles. A system of this kind uses a succession of 20 meter long copper strips fixed onto a roadway surface. The respective 20 meter long copper strips were positioned end to end along each lane of the roadway and were electrically insulated from each other.

Alternating current electric power (AC-network) was applied to each section or portion.

c. Vehicle-Related Transmitter.

When an appropriate electrically powered vehicle travels over the respective sections of copper strip, a transmitter, mounted to the vehicle, turns on the power supply to that section of copper strips on which the vehicle is traveling.

d. Vehicle Related Pick-Up Arms.

Electrically operated pick-up arms on the vehicle are adapted to contact the copper strips and to obtain electricity from the roadway-related copper strips.

This electricity from the copper strips is used to run a vehicle-related electric motor on board the vehicle (and also to activate vehicle accessories and, optionally, to recharge batteries on the vehicle).

The electricity supply to each copper strip is only turned on during 1.5 seconds, i.e. the time period during which the vehicle passes over that section of copper strips.

In the absence of a signal from a vehicle, the power to that section of copper strip remains off.

In order for the vehicle to be able to pick up electric power from the roadway-related conductors or strips positioned on the roadway surface, the vehicle may be provided with a pick-up arm located under the vehicle body.

The pick-up arm may comprise a flat plate hinged to the underside of the vehicle.

Two pick-up carbon brushes may be bonded to the plate, for example by an epoxy resin or adhesive.

Leads carry the power from/to each brush to the vehicle (to the motor controller and battery pack of the vehicle). (Page 7, lines 8-13)

The pick-up arm may be retracted and extended automatically.

For example, if the vehicle detects that it is traveling over a pair of electrically conductive strips (members), the pick-up arm may be automatically extended downwardly such that the brushes contact the electrically conductive strips.

In one embodiment, the electrically conductive arm is operated such, that if power is lost for more than a predetermined time period, such as from one-half to one second, the pick-up arm is automatically retracted. (Page 7, lines 14-19)

Vehicles traveling over the pairs of copper strips must be able to pick up electric power from those strips.

A large number of different designs may be used in this regard. However, one possible design is shown with reference to FIG. 2.

In FIG. 2 a vehicle 50, having wheels 52, 54, is provided with a plate 56. Plate 56 may for example be approximately 1.620 mm wide and 100 mm long.

The plate 56, as shown in FIG. 2, stretches approximately across the full width of the vehicle.

The plate 56 may be provided with one or more holes to enable air to pass therethrough to reduce the amount of down force acting on the plate when the vehicle is traveling.

The plate 56 carries two electrically conductive brushes 58, 60.

A gap 62 is located between the brushes 58, 60.

As an example, each brush may be 800 mm wide and the gap may be 20 mm wide.

The gap 62 may be filled with an electrically insulating material, suitably an insulating material that is somewhat soft and can yield without breaking, should it contact an object. (Page 14, lines 7-18).

The use of a wide pick-up plate eliminates the need for a lateral traversing mechanism for the pick-up arm.

It also eliminates the need for any device to detect the vehicle's lateral position in relation to the electrically conductive strips.

All a driver has to do to achieve initial contact is to drive along the electrically conductive strips somewhere within the vehicle's track and move the pick-up arm to the down position.

Contact will be maintained so long as the electrically conductive strips remain within the vehicle track.

Automatic steering may be used to assist in this regard on a longer drive. (Page 14, lines 27-30, page 15, lines 1-2)

The brushes 58, 60 must be able to be lowered onto the strips or retracted against the underside of the vehicle.

To this end, the brushes are mounted on a pair of pantograph arms 64, 66.

The pantograph arms keep the plate 56 (and therefore the brushes 58, 60) horizontal.

Appropriate electrical connections may be provided to enable the electrical power picked up from each of the brushes 58, 60 to be transferred to the vehicle.

The pantograph arms may carry appropriate electrical cables to transfer electric power from the brushes to the vehicle. (Page 15, lines 4-10)

e. DC-Voltage Difference Between Roadway Related Conductors, Contacts or Strips.

It is further suggested (page 2, lines 18-22) that preferably DC power with its voltage exposes a difference between each conductor or strip in a pair of conductors and that said voltage does not exceed 600 volts. More preferably, the DC power and its voltage difference between each conductor in a pair of conductors or strips do not exceed about 450 volts. Suitably, each conductor is at a voltage relevant to earth that does not exceed plus or minus 250 volts, more preferably not exceeding plus or minus 225 volts.

f. Orientation of the Roadway Related Conductive Strips.

The electrically conductive strips may be positioned on the roadway surface such that they are insulated from each other and from earth (the road surface). Suitably, the electrically conductive strips are laid onto an adhesive insulating base, which insulates them from each other.

The electrically conductive strips may be bonded to the roadway surface by an epoxy adhesive. Alternatively, the electrically conductive strips may be bonded to tiles that are then placed in or on the roadway surface.

g. Power Supply System.

The power supply system comprises a series of separate, electrically insulated but electrically conductive strips.

Each pair of strips represents a power supply section.

Each pair of strips may be provided with a dedicated source of DC power.

Alternatively, a source of DC power may provide direct current electricity to two or more pairs of strips.

h. Detector Means or Arrangement.

The switching means is suitably operatively associated with a detector means for detecting the presence of a vehicle, either about to move onto a pair of conductors or strips or on a pair of conductors.

For example, the coded signal may comprise an oscillating voltage similar to that used by utility companies for control purposes.

Such a control signal may have a frequency in the order of 400 kHz and a voltage of up to about 4 to 20 volts.

It will be understood that the coded signal may utilize different frequencies and different voltages from those given above. (Page 4, lines 19-29)

When one roadway section of conductors or strips is turned on, a control signal may be sent to the power supply for the next section of conductors along the path of travel of the vehicle.

This control signal, sent to the power source for the next section of conductors or strips, is used to turn on the power supply to the next section of conductors, either shortly before or just as the vehicle arrives at the next section of conductors.

Alternatively, the control signal sent to the next section of conductors or strips may turn on the power supply to that next section of conductors at a predetermined time after the power supply to the first set of conductors or strips is activated.

In order to detect the arrival or imminent arrival of a vehicle in a section of copper strips, the vehicle may be provided with a coded signal that becomes superimposed on the strips when the vehicle travels over a section or portion of the copper strips and the brushes on the vehicle are in contact with the strips.

The coded signal is received by a detector associated with a corresponding transformer station.

The detector actuates the switching of power up to that particular section of the strips.

i. Power Supply to an Adjacent Pair of Conductive Strips.

The power supply to the next set of conductor means or strips is maintained, provided that the next set of conductors or strips detects that the vehicle enters the next set of conductors or strips within a specified time period after the power supply to the next set of conductors or strips has been turned on.

In this way, if the vehicle turns off the roadway and therefore does not enter the next set of conductors or strips, the next set of conductors or strips will not detect the presence of the vehicle and therefore will shut off the power supply shortly after it has been turned on.

In this embodiment, the adjacent sections of conductors "talk" to each other and interact with each other to turn on the power supply to each roadway section with its strips either just before or just as a vehicle arrives at each section.

j. Sensor Arrangement.

A sensor arrangement may be located towards the "downstream" end of each pair of strips.

The sensor arrangement may, for example, be a current flow sensor positioned below or adjacent to one of the electrically conductive strips.

When a vehicle is near the end of a roadway section (of electrically conductive strips), the sensor will sense the resultant current flow and then send a signal to the next section of electrically conductive strips to turn on the electricity supply to the next section in "anticipation" of the imminent arrival.

This signal may be sent via cable. The "anticipatory" signal is valid for a short time only, say 2 seconds, and if a vehicle has not arrived at the next section within that time, the next section is turned off.

k. Conditions for Activating Switching Means.

The switching means may be arranged such that the signal that is used to turn on the next pair of conductive strips must be larger than a predetermined minimum value in order to activate the switching means and turn on the next pair of conductive strips.

In this manner, if the next pair of conductive strips is subject to conditions of high electrical leakage, the signal will be lower than the minimum required to turn on the next pair of strips.

This is effective to minimize excessive electrical leakage which could lead to unacceptable power wastage and/or to damage to the transformer/rectifier. (Page 4, lines 28-29, page 5, lines 1-4).

The use of a coded signal also allows for the possibility of enhanced operation and safety by incorporating an electricity leakage test into the apparatus.

In these instances, an electrical leakage detection means may be provided to prevent the next section of conductors or strips from turning on.

Detection of electrical leakage may occur by requiring the coded signal superimposed on each section of conductors or strips to exceed a predetermined activation threshold value before the next section of conductors or strips will be turned on.

In this fashion, superimposing the coded signal onto the conductors or strips will result in the coded signal representing the criteria not exceeding the predetermined threshold value if conditions of high electric leakage are present. Thus, the next section of conductors or strips will not be turned on in such situations. (Page 8, lines 15-28)

l. Battery Arrangements.

The vehicle may be provided with one or more batteries to store electric power or energy.

The batteries may be charged using electricity received from the roadway related electrically conductive strips.

In some embodiments, the DC voltage of the electrically conductive strips is such that it is equal to the normal charging voltage of each battery pack in the vehicle.

This allows for the vehicle motor to have an essentially seamless transition to and from battery and on-road conductors or strips whenever there is a break and then a resumption of the on-road conductors or strips. (Page 6, lines 29-30, page 7, lines 1-5)

m. On-Board Charging Engine.

The vehicle may alternatively or additionally be provided with one or more of an on-board charging engine or a regenerative braking system to allow for recharging of the batteries. (Page 7, lines 6-7)

n. Overload Cut-Out and Re-Close Switch.

Each transformer may have an overload cut-out and re-close switch.

This switch suitably operates on the DC side of the transformer and a rectifier. Each DC output line from the transformer and rectifiers may have independent overload switches.

The overload cut-out and re-close switches may be set such, that if three re-close attempts are unsuccessfully made the section is shut down and a signal is automatically sent to the control panel to indicate a fault.

Vehicles may then proceed across this dead section using an on-board battery power system. (Page 12, lines 10-16)

o. Safe Conditions of Bare Electric Roadway Related Electric Conductors or Strips.

A question may be raised as to whether bare electric conductors or strips on a road surface can be safe. In the system here proposed, they are safe.

In particular, the present invention uses mains power but delivers DC voltage at relatively low volts.

Moreover, each copper conductor or strip is insulated from the roadway surface and from the other copper conductor or strip in its respective pair.

Thus, standing on one of the conductors or strips will not complete any circuit and therefore little or no current will flow through a person standing on one of the copper conductors or strips.

Further, the DC voltage supply to the conductors or strips is created by transforming and rectifying high voltage, three-phase (alternating current) AC-power, to give a positive DC-power to one conductor or strip and an equal negative DC-power to the other conductor or strip in each pair of conductors or strips. (Page 12, lines 19-20)

p. Use of DC Voltage or AC Voltage to Supply Power to the Roadway Related Electric Conductors or Strips.

The use of DC voltage rather than AC voltage contributes to the electrical safety of the system.

The actual DC voltage that is supplied to the pairs of copper conductors or strips will depend upon several factors.

For example, the lower the standard DC voltage selected, the lower will be the perceived electrical safety risk, the lower will be the actual energy leakage, when a roadway is wet and the conductors or strips are on, and the fewer the number of battery cells in each vehicle to provide an on-board power supply.

On the other hand, the weight of copper conductors or strips and/or the number of transformers needed for the on-road installation is inversely proportional to the square of the standard voltage.

That is to say, other things being equal, if the voltage is halved, the weight and cost of copper material needed will rise fourfold.

It has been found that possible standard voltages may lie anywhere between about 100 and 600 DC voltage. (Page 12, lines 3-12)

q. Magnetic Field Sensor.

An array of magnetic field sensors may be placed across the front and rear of the vehicle (page 20, lines 3-9) to sense the position of the conductive strips.

r. Snow Ploughs and Blower Arrangements.

The use of snow ploughs and blower arrangements is also suggested. (Page 21, lines 28-30.)

s. Electrical Heating Tape.

It is also suggested to use an electrical heating tape beside each conductor or strip to aid the clean removal of snow and ice in winter time. (Page 22, lines 1-3.)

This invention intends to concentrate on a vehicle-related arrangement, for actuating upwards and downwards and sideways a means cleaning or cleansing the track (groove) or tracks (grooves) from loose and/or solid particles along the stretch of a roadway, such as in the form of a contact means or a current collector intended for cooperation with electric conductors with contact surfaces, which may be placed under electric voltage and are disposed along individual tracks, wherein such cleansing means is/are to be able to be displaced when the vehicle and its contact means is driven forward and, as a suggestion, are to be disposed, counted in the direction of movement, as a unit in front of or as a contact means, shaped as a current collector.

DISCLOSURE OF THE PRESENT INVENTION

Technical Problem

If the circumstance is considered, that the technical considerations that a person skilled in the relevant technical art will have to carry out in order to offer a solution of one or more posed technical problems are on the one hand initially a necessary insight into the measures and/or the sequence of measures which are to be performed and on the other hand a necessary choice of the one or several means which are required, the following technical problems must be considered to be relevant in consequence hereof in producing the present subject of invention.

Considering the earlier standpoint of technology, as it has been described above, it should therefore be seen as a technical problem to be able to understand the significance of, the advantages related to and/or the technical measures and considerations which will be necessary for conveying an electrical, and by i.a. one or more batteries in a set of batteries, conveyable vehicle along a stretch of a roadway and its roadway portions adapted system, which is to comprise; "a" a plurality of road sections or portions for subdividing the stretch of the roadway, wherein each one of these roadway portions is allotted one or more elongated tracks or slits having introduced therein current supplyable and under voltage placeable electrically conductive conductors or strips connectable over a switch to one or more power sources as stationary electric stations, serving as an external source of power (designated as a third source of power in the following) of the vehicle so as to thereby i.a. charge said set of batteries associated with the vehicle, which set is to be able to propel the vehicle directly along the roadway sections, and "b" one or more vehicles, propellable over an individual electric motor or motors, and wherein the respective vehicle exhibits a control circuit, controlling the necessary power for creating necessary power and/or speed control, indicating the possibility of utilizing equal or different lengths of parallel electric conductors or strips, which may be subjected to electric power or voltages, related to mutually electrically insulated road sections so as to therein offer a possibility of choosing the lengths of the conductors and road sections in response to established requirements of a "continuous" supply of energy to the vehicle and its set of batteries and wherein the lengths of the respective roadway sections to advantage can be chosen considerably longer than the total length of the vehicle, so that no adaptation of the lengths of the road sections to any standard lengths of the vehicles will be required such as in known technology.

There is a technical problem or a technical consideration in being able to understand the significance of, the advantages related to and/or the technical measures and considerations which will required for cleaning or cleansing a track along the stretch of roadway from obstacles, such as sand, gravel, water, ice, snow and similar cleaning means but also a means which can give way and pass over a fixed obstacle, wherein the cleaning means, primarily in the latter situation, will require being rotatably secured within its upper area over a horizontally oriented axis of rotation so that the cleaning means and/or said axis of rotation are movably disposed in a vertical direction over a resilient or spring means towards and from a chassis allotted to the vehicle.

There is a technical problem or a technical consideration in being able to understand the significance of, the advantage related to and/or the technical measures and considerations which will be required for letting the cleansing means have, in the direction of motion, a forwardly directed edge portion, which edge portion is to be allotted to a pointed forwardly directed area facing towards the track and its conductor (-s).

There is a technical problem or technical consideration in being able to understand the significance of, the advantage related to and/or the technical measures and considerations which will be required for having an angular value of said pointed edge portion to be chosen to fall within an angle area of 30 to 60°, such as around 45° related to a vertical plane.

There is a technical problem or a technical consideration in being able to understand the significance of, the advantage related to and/or the technical measures and considerations which will be necessary for letting a spring means be dimensioned for a limited vertical force active against the conductor surface and/or against the bottom of the track.

There is a technical problem or a technical consideration in being able to understand the significance of, the advantage related to and/or the technical measures and considerations which will be required for having a pointed forwardly directed edge portion be allotted such an angular value, with regard to the track, being able to throw a loose obstacle and/or several loose obstacles and/or water in a direction upwards and away from the track in consequence of its allotted speed.

There is a technical problem or a technical consideration in being able to understand the significance of, the advantage related to and/or the technical measures and considerations which will be required for having a lower flat surface area of the cleansing means being bent slightly upwards from the bottom of the track and/or the conductor surface in connection with its forwardly pointed edge portion or area.

There is a technical problem or a technical consideration in being able to understand the significance of, the advantage related to and/or the technical measures and considerations which will be required for letting such a cleansing means be allotted a shape which is adapted to connect to and/or to form a current collector, with its two or more contact surfaces.

There is a technical problem or a technical consideration in being able to understand the significance of, the advantage related to and/or the technical measures and considerations which will be required for letting, in a contact means or a current collector related to a vehicle as disclosed above and being intended to be able to run freely along a track oriented along the stretch of the roadway permitting said means and/or said current collector be shaped of a main portion, made of an electrically insulating material, with its lower surface facing the conductor surface (-s), which may be placed under voltage or the bottom of the track, be shaped flat, or at least substantially flat, with a lower contact surface disposed under said lower surface and consisting of an electrically conductive material, with the electrically conductive material being adapted to extend through the main portion, for forming one or more contact surfaces or connecting conductors, to the upper surface of the main portion.

There is a technical problem in being able to understand the significance of, the advantages related to and/or the technical measures and considerations which will be required for letting the main portion be allotted a surface width along the track and connecting or adapting to the width of the track with its thickness and having a form of or connecting to the form of a parallelogram or an oblique parallelepiped.

There is a technical problem in being able to understand the significance of, the advantages related to and/or the technical measures and considerations which will be required for letting the upper and lower surfaces of the parallelepiped be adapted to be parallel or at least substantially parallel.

There is a technical problem in being able to understand the significance of, the advantages related to and/or the technical measures and considerations which will be required for letting two or more current collectors, in an extension along the track, be coordinated with one and the same conductor surface, which may be subjected to voltage and moreover adapted to form such current paths which can be connected in parallel.

There is a technical problem in being able to understand the significance of, the advantages related to and/or the technical measures and considerations which will be required for letting a first main portion be allotted a parallelepipedic shape which deviates somewhat from a parallelepipedic shape of a second main portion.

There is a technical problem in being able to understand the significance of, the advantages related to and/or the technical measures and considerations which will be required for shaping one or more lower contact surfaces for said current collector into said lower surface for said main portion.

There is a technical problem in being able to understand the significance of, the advantages related to and/or the technical measures and considerations which will be required for having a resilient member or a spring means including member adapted to urge said main portion, such as with its lower contact surface and/or lower contact surfaces, against the upper surface of the conductor surface, which will be subjected to voltage, or the bottom of the track.

There is a technical problem in being able to understand the significance of, the advantages related to and/or the technical measures and considerations which will be required for having two or more cleansing means and/or current collectors disposed parallel and allotted each one of two or more parallel tracks along the stretch of the roadway.

There is a technical problem in being able to understand the significance of, the advantages related to and/or the technical measures and considerations which will be required for having the current collector, at least with its lower contact surface, be made of steel, stainless steel, copper, brass, bronze, aluminum and/or hard coals.

There is a technical problem in being able to understand the significance of, the advantages related to and/or the technical measures and considerations which will be required for having the current collector allotted at least one lower contact surface, with the latter being shaped as a brush unit and consisting of steel, stainless steel, copper, brass, bronze, aluminum and/or hard coals.

There is a technical problem in being able to understand the significance of, the advantages related to and/or the technical measures and considerations which will be required for having the conductor surface (-s), which can be placed under voltage, be made of steel, stainless steel, copper, brass, bronze, aluminum and/or hard coals.

There is a technical problem in being able to understand the significance of, the advantages related to and/or the technical measures and considerations which will be required for letting a lower surface of the cleaning or cleansing means and/or a lower contact surface be adapted to engage said conductor surface (-s), which may be placed under voltage or the bottom of the track, with a force of between 1 and 15, such as between 2 and 5 $N/cm^2$ There is a technical problem in being able to understand the significance of, the advantages related to and/or the technical measures and considerations which will be required for letting said two or more conductors, which may be placed under voltage, be coordinated to the bottom of their respective tracks within a common canalization.

There is a technical problem in being able to understand the significance of, the advantages related to and/or the technical measures and considerations which will be required for letting said conductor surface (-s), which may be placed under voltage, be shaped as a rail or band, having an upper broad contact surface and a limited thickness.

There is a technical problem in being able to understand the significance of, the advantages related to and/or the technical measures and considerations which will be required for having a complete canalization being produced as a flexible unit and bendable to a roll.

The Solution

This invention has the purpose of indicating a further development of the arrangement mentioned above in a system as disclosed above and apart from this to indicate utilization of the prerequisites mentioned above by letting the vehicle related contact means or current collector be intended to be able to run freely along the track oriented along the stretch of the roadway and, where said current collector as a cleansing means is formed as a main portion structured of an electrically insulating material having its lower surface, facing the conductor or contact surface, placed under voltage, being made flat or at least essentially flat with a lower contact surface disposed in said lower surface and consisting of an electrically conductive material, and having said electrically conductive material being adapted to extend through the main portion for forming one or more upper contact surfaces and/or connecting conductors to the upper surface of the main portion.

As a starting point this invention utilizes the known technology indicated by way of introduction and is based on a vehicle-related system for adapting in an electrically, i.a. by one or more batteries or a set of batteries, conveyable vehicle being driven along a stretch of a roadway and its associated roadway sections or portions, this system may comprise: "a" a plurality of roadway sections or portions subdividing the total stretch of the roadway and each allotted to one or more electrically conductive surfaces, such as conductors or strips, said roadway portions being connectable over a switch to one or more stationary electric stations serving as a source of power or energy external to vehicles so as thereof i.a. to charge batteries and/or sets of batteries belonging to vehicles intended primarily to propel the vehicle by means of said set of batteries along the stretch of the roadway and its roadway sections or portions and "b" one or more, over an individual electric motor or a plurality of motors, propellable vehicles, wherein each of said vehicles is to exhibit a control circuit, controlling the power so as to create a chosen and required propelling effect and/or a speed adaptation and/or control.

This invention concerns disclosing a further development of the arrangement mentioned above within the system mentioned above and apart from this to show a continuation of the prerequisites mentioned above by indicating the utilization of a track having its conductor surface (-s) cleaned or cleansed from loose particles or water and/or means which may be removed by solid obstacles, with said means being related to the lower portion of the chassis of the vehicle and being intended to be displaced from the track and its conductors or bottom, which are subjected to voltage.

Thus, the present invention more specifically discloses a means cleaning or cleansing the track from obstacles, such as sand, gravel, water, ice, snow and the like but also a means which can give way for and pass over a solid obstacle, where the cleansing means above all for the latter situation requires that said means in its upper most portion is to be rotatably attached by means of a horizontally oriented axis of rotation.

The cleansing means and said axis of rotation are to be movably attached, in a vertical direction, towards and away from a chassis allotted to the vehicle, by resilient or spring means.

The means is, within an edge portion oriented in the direction of motion, to be shaped with a forwardly directed edge portion, which edge portion is suggested to be allotted a pointed portion, which can be connected to and arranged closely to the track and its conductor surface or bottom.

The angle of this pointed portion is here proposed to fall within the angular range of 30° to 60°, such as around 45° related to a vertical plane.

The resilient means is here to be dimensioned for a limited vertical force, acting against the conductor surface (-s) placed in the track (-s) or at the bottom of the track (-s).

Said edge pointed portion is to advantage to be allotted an angular value, with regard to the track (-s), for being able to push away any loose obstacle and/or water and/or several loose obstacles in a direction upwards and in a direction away from the track (-s) in a cleansing process.

These lower flat surface portion can then be slightly bent upwards from the conductor surface or the bottom of the track (-s) in connection with its edge pointed portion.

The shape of and the function of the cleaning or cleansing means can to advantage be adapted to expose, or at least approximately, the shape of a current collector.

The vehicle-related means or current collector can be intended to run freely along the track (-s) oriented along the extension of the roadway, with the means or current collector being formed as a main portion, shaped from an electrically insulated material, with its lower contact surface facing the conductor surface, which may be placed under voltage or the bottom of the track, being shaped flat and/or at least substantially flat, and having a lower contact surface formed within said lower surface and consisting of an electrically conductive material, with the electrically conductive material being adapted to extend through the main portion for forming one or more contact surfaces or connecting conductors to the upper surface of the main portion.

The main portion is then to be allotted an extension of its surface along the track (-s) and having a thickness similar to but somewhat less than the width of the track and having the shape of a parallelogram or a parallelepiped or having a form similar to such.

The upper and lower surface extensions of the parallelepiped can be adapted parallel.

Two or more current collectors are, in an extension along the track (-s), coordinated with one and the same conductor surface, that may be placed under voltage, and are apart from this adapted to form, in parallel connected, conductors.

A first main portion can be allotted a parallelepipedic shape which deviates from the shape of a second main parallelepipedic shape.

Two or more lower contact surfaces are connected to said lower surface of said main portion.

Resilient and or spring means are to be adapted to urge the main portion and its lower contact surface or lower contact surfaces against the conductor surface, which is placed under voltage, and arranged to the bottom of the track (-s).

Two or more current collectors are oriented parallel and allotted individual ones of two or more parallel tracks.

The current collector is, at least with its lower contact surface, made of steel, stainless steel, copper, brass, bronze, aluminum and/or hard coals.

The current collector is allotted at least one lower contact surface, and the latter is shaped as a brush unit, consisting of steel, stainless steel, copper, brass, bronze, aluminum and/or hard coals.

The conductor surface, which may be placed under voltage, is to be made of steel, stainless steel, copper, brass, bronze, aluminum and/or hard coals.

The lower contact surface is adapted to engage, with a force of between 1 and 15, such as between 2 to 4 $N/cm^2$, said conductor surface (-s), which may be placed under voltage, and/or the bottom of the track (-s).

Said two or more conductor surfaces, which may be placed under voltage, are coordinated to the bottoms of their respective tracks within one and the same canalization.

Said conductor surfaces, which may be placed under voltage, are shaped as rails, strips or bands, having an upper broad contact surface and a limited thickness.

The canalization is to be capable of being flexible and/or resilient and bent to a roll as a unit.

Advantages

It is here indicated that the cleaning or cleansing means of the vehicle can be shaped as a current collector, intended to be able to run along the track oriented to a stretch of a roadway, that the cleansing means and/or the current collector are to be formed as a main portion, made of an electrically insulating material, the lower surface of which, facing the conductor surface, being placed under voltage, is shaped flat or at least essentially flat, for example shaped within said lower surface, of an electrically conductive material consisting of a lower contact surface and the electrically conductive material being adapted to extend through the main portion for forming one or more upper contact surfaces or connecting conductors to the upper surface of the main portion.

The invention indicates that a cleaning means, cleansing or cleaning the track from obstacle, such as sand, gravel, water, ice, snow, and similar, but also a cleansing means which can give way to and pass over any solid obstacles, where the cleansing means primarily for the latter situation requires means to be rotatably fastened in its upper area over a horizontally oriented shaft of rotation and is to be rotatably fastened where the cleansing means is moveably fastened in a vertical direction to and from a chassis, allotted to the vehicle and with the aid of said resilient or spring means.

The cleansing means is to be shaped with, in the direction of motion, a forwardly directed and pointed edge portion, said edge portion being allotted a forwardly directed pointed portion, which can be connected to or arranged close to the bottom of the track and its conductor surface.

The subject matter which may be considered to be characteristic of an arrangement related to the vehicle and related to a contact means as a current collector and including a cleaning or cleansing means, in accordance with the present invention, is clearly disclosed in the characterizing portion of the following patent claim 1.

SHORT DESCRIPTION OF THE DRAWINGS

Figure 1B:
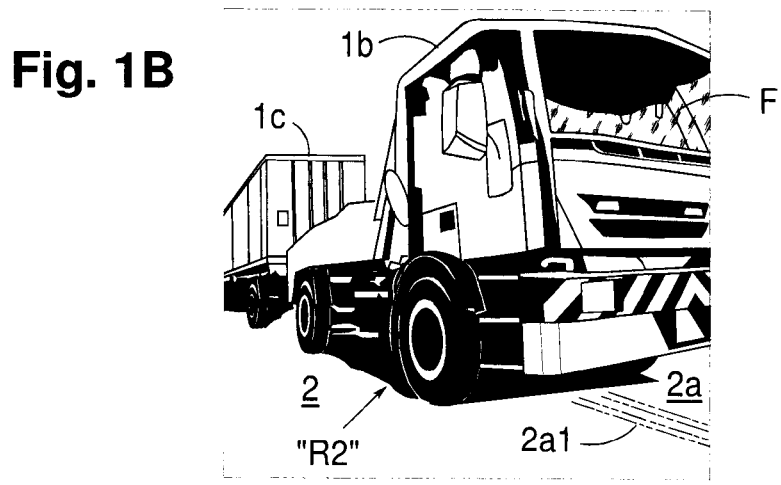
Figure 1C:
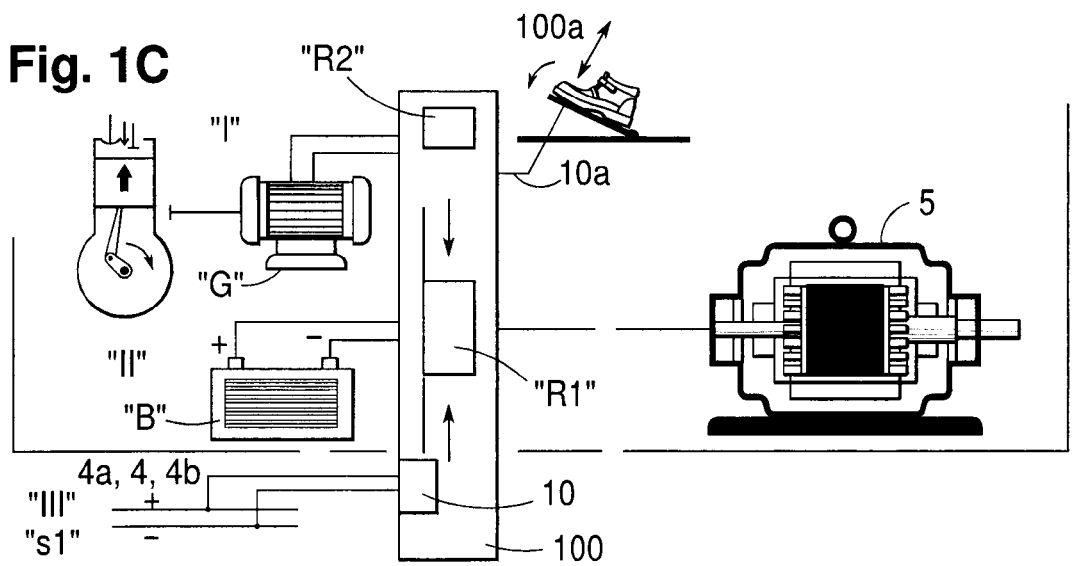
Figure 10:
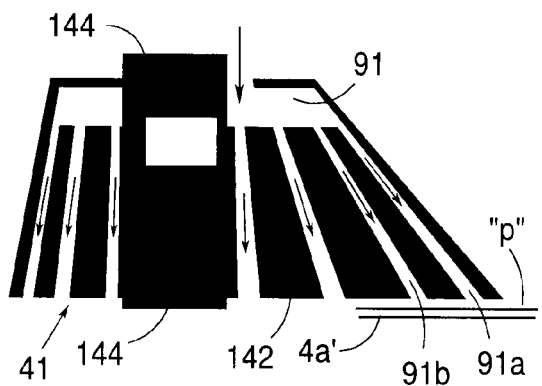
Figure 11:
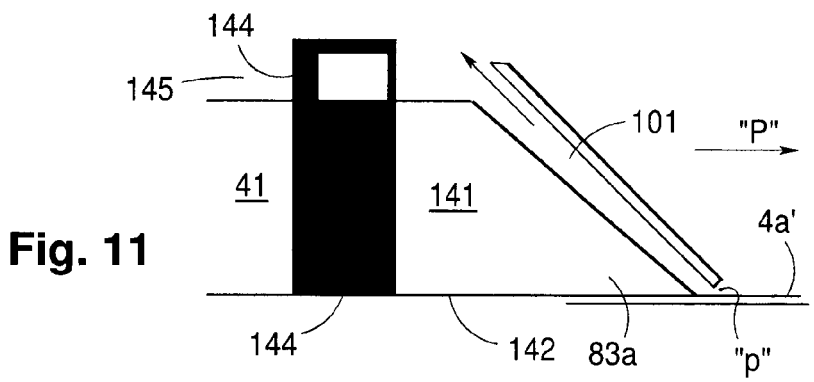
Figure 12:
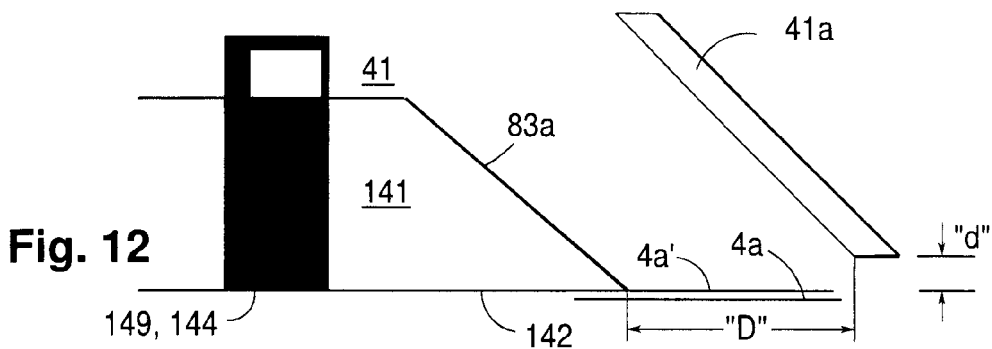
Figure 13:
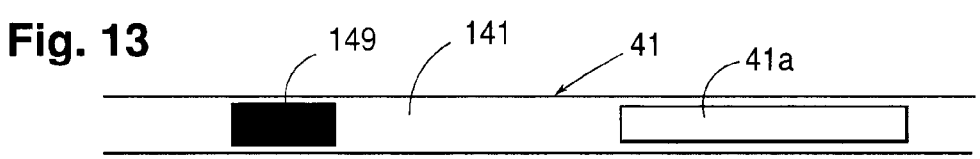
Figure 14:
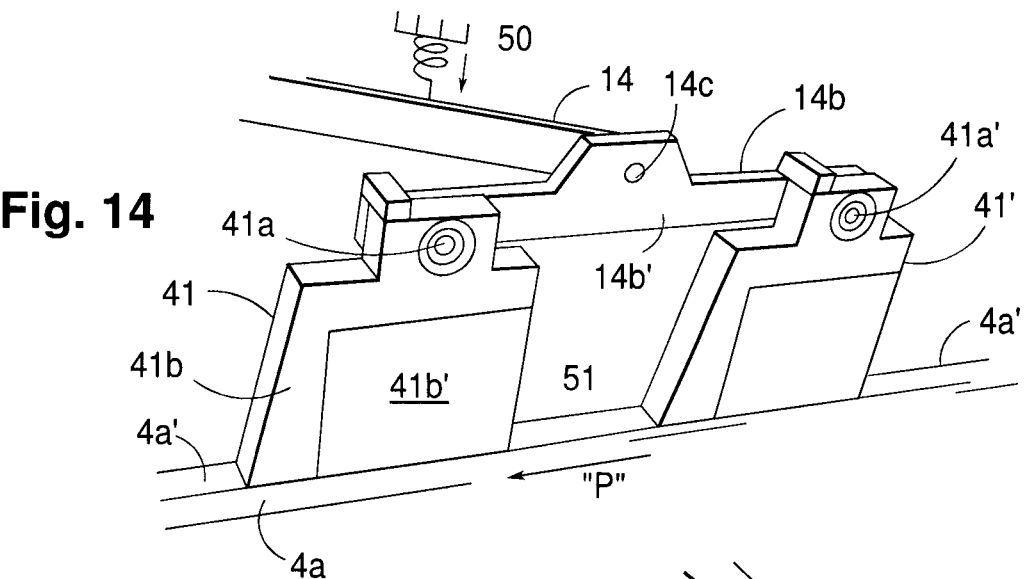
Figure 15:
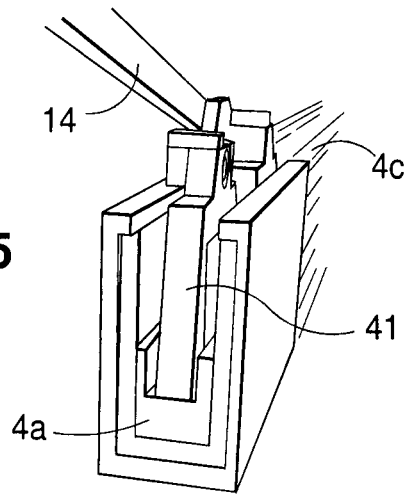
Figure 16:
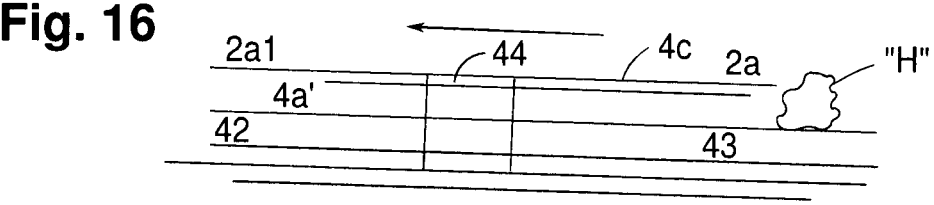

Prior art and a presently proposed embodiment, exhibiting the significant characteristics related to the present invention, will now as an example be described more specifically with reference to the accompanying drawings in which:

FIG. 1A shows a perspective view of a vehicle, illustrated as a Ford Model A, converted to being battery powered and having an electrically powered engine or motor, a control circuit controlling the power for speed control and adaptation to an instantaneously acting load and necessary power, as well as a control arrangement or control equipment intended for use in driving and steering the vehicle, FIG. 1B shows a perspective view of a truck with a trailer and with a control circuit controlling the power in accordance with the basic principles of FIG. 1A, FIG. 1C shows in an overview that two vehicle-related power sources, a first one ("I"), a diesel generator, a second one ("II"), a battery or a battery set, and is a third one ("III"), an external source of power to the vehicle, feeding electric power to parallel conductor surfaces, such as rails or strips, which may be subjected to power or voltage and which surfaces are arranged in continuous grooves in a roadway, are coordinated to a vehicle-related control circuit, which in response to a necessary supplied power to an electric motor makes possible the selection of all or a combination of the power-feeding sources of energy, wherein the power control is illustrated here as a throttle having its motion related to a control circuit "R2", FIG. 1D illustrates a P/t-diagram (power/time) wherein full power or reduced power is to be transferred over the control circuit to the vehicle so it can pass along a roadway, its road sections or portions and its conductors or strips, FIG. 2 basically shows an electric arrangement related to a vehicle having control equipment for controlling a current collector or commutator arranged against electric contact surfaces, with paired conductors shaped as rails or strips for enabling parallel operation of an electric vehicle-related motor from one or both of the two power sources (first and second ones) related to the vehicle and/or from the stationary (third) source of power related externally to the vehicle or the peripheral (third) source of power, FIG. 3 shows an end view of a vehicle with its downwardly directed contact means or current collectors in the form of a sliding contact in cooperation with two individual contact surfaces, as conductors, strips or rails, allotted to the road section or portion and being under power or tension, FIG. 4 shows an example of an electric arrangement in which a number of road sections are provided with parallel conductors under tension, each one being connectable over a switch to its vehicle external or vehicle peripheral electric station and in which roadway section after roadway section may be activated and are placed under power by the activation of a coupling means or a switch over a control unit as said vehicle passes roadway section after roadway section, FIG. 5 shows in a perspective illustration the manner of which coupling means or current collectors (removers) in pairs cooperate with one track and one conductor surface, which may be subjected to voltage and illustrating a second track for similar current collectors (not shown), FIG. 6 shows a cross section of a canalization with two conductors and its conductor surfaces, which may be placed under electric voltage, disposed in individual tracks in a canalization, FIG. 7 illustrates the structure of two behind each other, in a normal and chosen direction "P" of motion for the vehicle, disposed current collectors (removers) as cleansing means for one and the same track, FIG. 8 shows, in two different positions of a current collector, illustrating the function of a track cleaning or cleansing means caused by a collision with a "fixed" obstacles, when said means strikes said obstacle and when said obstacle has turned said means around its axis of rotation, FIGS. 9 and 10, respectively, show side views of two different contact means or current collectors as cleansing means, structured for a simultaneous cleaning or cleansing of the track by means of a compressed air, FIG. 11 shows a side view of contact means or a current collector as a cleansing means, structured for suppressing the track in front of said means with its conductor surface and/or said contact surface, said contact surface being subjected to voltage, FIG. 12 shows a side view of a contact means or a current collector as a cleansing means, with an eddy zone formed in front of it, FIG. 13 shows said contact means of FIG. 12 in a vertical view, FIG. 14 shows a contact means or a current collector as a cleansing means, similar to the two means shown in FIG. 5, in which a first contact means has initially been allotted a cleansing function to cleansed the track from small objects or obstacles, FIG. 15 shows the first contact means in a current collecting position, and running along a track and cooperating with a conductor surface at a rail and its contact surface, and FIG. 16 shows the two contact means in a position above the position illustrated in FIG. 14 after a collision with a stationary or fixed object or obstacle and have left a cooperating with its track and contact surface.

DESCRIPTION OF THE PRESENTLY PROPOSED EMBODIMENTS

By way of introduction it shall be mentioned that in the following description of presently proposed embodiments exhibiting the significant characteristics related to the invention and being clarified by the figures illustrated in the accompanying drawings, we have chosen terms and specific terminology with the purpose of thereby primarily clarifying the concept of the invention itself.

However, in this connection it should be noted that the terms chosen here shall not be seen as limiting solely to the terms utilized here and it should be understood that each such term is to be construed such that in addition it will include all technical equivalents which operate in the same manner or essentially the same manner so as thereby to be able to achieve the same or essentially the same purpose and/or the same technical result.

Thus, with reference to the accompanying drawings the basic prerequisites of the present invention are shown schematically and in detail, with the significant characteristics related to the invention being concretized in consequence of the now proposed and in the following more specifically described embodiments.

Thus, FIG. 1A shows a system "S" adapted for driving an electrically, and by one or more batteries or a set of batteries, propellable vehicle 1 along a stretch of a roadway 2 and its roadway sections or portions 2a1 and 2a1'.

Exterior ally the vehicle 1 consists of a Ford Model A, but this is converted to a battery powered vehicle having continuous access to an external third source of power or energy, which here is designated "III" and "s1" for a stationary station.

The vehicle 1 according to the invention is also to comprise a not shown steering arrangement 3 or steering equipment so that a driver "F" (not shown) can drive and steer the vehicle 1 along said stretch of roadway 2 and its road section or portion 2a1.

Vehicle 1 would also be able to include a gear box and other parts and components which are required for advancing the vehicle, but as these parts are well-known to a person skilled in the art they will not be described in detail.

However, an electrically driven vehicle 1 does not need a gear box as speed control, and adapted power can occur over known electric and electronic circuits.

In the same manner as FIG. 1A, FIG. 1B shows an electrically propellable truck 1b with a connected trailer 1c along the stretch of roadway 2, 2a and its associated roadway section or portion 2a1.

FIG. 1C clearly shows three vehicle-related and vehicle-associated sources of power, which here are designated "I", "II" and "III", a "first" one in the form of a diesel generator "G", a "second" one in the form of a battery or a set of batteries "B", and a "third" one in the form of a source of power positioned externally of the vehicle 1, here taking the form of parallel conductive surfaces, such as conductors, rails or strips, which may be subjected to power or voltage over switching means or switches, and introduced into tracks, grooves and/or a cavity along each roadway section or portion along the entire stretch of the road 2.

In FIG. 1C the three sources of power are coordinated to a vehicle-related power control circuit 100, which in response to power supplied to an electric driving motor 5 chooses all or a combination of the three power feeding energy sources "I", "II" and "III", respectively. Here the power control is illustrated as a throttle 100a, the movement of which upwards and downwards is connected to a control circuit "R2" in power control circuit 100, which in turn is related to a circuit "R1" distributing power and energy between the three power sources.

In a P/t (power/time) diagram FIG. 1D illustrates how full power or reduced power can be distributed and transferred for passage of the vehicle 1, 1b along different roadway sections or portions 2a1 of a roadway or stretch of a roadway 2 with the help of said circuit "R1" and control circuit "R2" and the power control circuit "100".

Between moments $t_1$-$t_2$ it is basically illustrated how complete removal of power from the three power sources "I", "II" and "III", respectively, can be carried out, with the power taken out from the power source "I" illustrated at the top, the power taken out from power source "II" illustrated therebelow, and the power taken out from power source "III" illustrated at the bottom.

Reduced removal of power from power sources "I" and "II" is basically illustrated between the points of time $t_3$-$t_4$, whereas power source "III" is shown disconnected in this case.

Reduced removal of power from power sources "II" and "III" is illustrated basically between the points of time $t_5$-$t_6$.

During this time period $t_5$-$t_6$ full power can be achieved from power source "II" and a small surplus can be permitted to be fed to the motor 5 and trickle charge the battery set "II", "B".

The invention is based on that the set of batteries "B" and the second power source "II", but particularly the third power source "III" primarily shall, over the distributing circuit "R1", supply motor 5 with power, and for this purpose the set of batteries "II", "B" will have to have stored power and apart from this will have to be dimensioned so as to drive motor 5 at full power.

The set of batteries "II", "B" is primarily to be trickle charged via power source "III", "s1" and secondarily to be trickle charged or charged over power source "I", "G".

The power or energy from power sources "I" and "III" can be chosen to be 5-30% of the power or energy associated with power source "II", "B", such as around 25%.

The supply power or voltage to motor 5 can be chosen to +400 VDC and −400 VDC, i.e. the voltage value of 800 VDC is to be supplied to the motor 5.

System "S" in FIG. 1A is then primarily to comprise "a" one or more over an individual electric motor 5 or motors electrically powerable vehicles 1, 1b, with the respective vehicle exhibiting a power distributing and/or controlling control circuit "R1" within said power control circuit 100, and for creating a necessary power and/or a speed control via a control circuit "R2" and a throttle arrangement 100a.

The necessary output power is to be supplied primarily by the vehicle-internal power source of energy "II", "B", which secondarily is to be placed under trickle charging from the third power source of energy "III", "s1".

In FIG. 4 the stretch of a roadway 2 is shown divisible into road sections or portions 2a (2a1, 2a2, 2a3); 2b (2a1', 2a2' and 2a3'), wherein each one to advantage can be allotted to an external power source "III" which here is illustrated as a number of electric stations "s1", "s2", "s3"; "s1'", "s2'", "s3'".

Of the third power source "III", "s1" external to the vehicle 1 and/or the first power source "I", "G" associated with the vehicle, one or both can thereby be utilized for supplementary charging the set of batteries "II", "B" of the vehicle 1 during an adapted time sequence of power removal from this set of batteries.

Within the scope of the invention there is also the possibility of in addition to driving the vehicle 1 via the set of batteries "II", "B" and in supplementary charging the set of batteries "II", "B" along the road sections or portions and the stationary electric station "s1" or any of the third power sources of energy "III", any additional necessary power and energy for driving the vehicle 1 over a road section or portion 2a1 can be supplied via power source "I", "G" associated with the vehicle.

FIG. 2 basically shows an electrical/mechanical switching arrangement "K" related to a vehicle 1, (1b) in a schematically illustrated vehicle-related arrangement in the form of control equipment 10 for controlling a contact member or a current remover or collector 4 associated with the vehicle 1 and to an electric contact with pairs of contact surfaces, as leads or strips, which may be placed under power or voltage and in the form of rails or strips 4a, 4b for the possible common driving in parallel of an electric motor 5 from the set of batteries "II", "B" and/or from the stationary station "III", "s1" and/or from the diesel generator "I", "G".

In this case current remover or collector 4 is related to a support 6 which may be displaced upwards and downwards vertically by means of a first electric auxiliary motor 7 and may be moved sideways back and forth by a second electric auxiliary motor 8.

The means and the control of auxiliary motors 7, 8, which are required for this movement with the assistance of sensors, are not shown in detail.

Both auxiliary motor 7 and auxiliary motor 8 may be activated in a movement directed forward and backward, wherein a first motion is activated over a first signal on a first conductor 7a and a first signal over a first conductor 8a, respectively, whereas a second (opposite) motion is activated by means of a second signal over conductors 7a and 8a, respectively, while the instantaneous setting positions of motors 7, 8 and support 6 are evaluated by one or more, not shown, sensors and are indicated by means of a generated signal on a second conductor or lead 7b and 8b, respectively.

These signals on the first conductors 7a, 8a are generated in a central unit or a power control circuit 100 having control equipment 10, and signals on the second conductor 7b and 8b are generated in the same central circuit 100 while utilizing position sensors (not shown).

Said power control circuit 100 with control equipment 10 is a complex unit, which i.a. over a sensor 16 is to be able to sense the existence of and the orientation of conductor surfaces, as conductors or strips 4a, 4b, and thereafter lower the current remover or collector 4 by means of auxiliary motor 7 to electric contact with these two conductors 4a, 4b, which here are illustrated as being placed under voltage.

Over a connection 10a to power control circuit 100 and its control circuit "R2" the power and energy which over circuit "R1" distributes the energy sources, is supplied to motor 5, and is here controlled by throttle arrangement 100a. For this purpose circuit "R2" will have to be controlled directly by said throttle arrangement 100a (FIG. 1C) so as to supply motor 5 with the required power over the circuit "R1".

In the illustrated position the current collector or remover 4 conducts current and voltage from power source "s1", "III" over to the power and energy distributing circuit "R1". The latter or a control circuit "R2" senses the power requirement of motor 5 over its central unit 100 and primarily feeds motor 5 with the power it needs according to the input signal on the connection or conductor 10a and generated output signal on the connection or conductor 10b so as thereby to load the stationary system "III", "s1" and supplement the power and energy requirements over battery settings "II" "B".

Connecting in parallel the power "III", "s1" taken out of the vehicle externally and the power "I", "G" and/or "II", "B" generated within the vehicle can here be carried out over circuits "R1" and control circuit "R2" and with the assistance of power control circuit 100.

Information about a desired speed and thereto related power of vehicle 1 is supplied to power central circuit 100 over conductor 10a, and circuit "R1" is affected over conductor 10b via internal circuits, which are not shown, and the function of the control circuit "R2", and control equipment 10.

FIG. 3 shows an end view of a vehicle 1, (1b) with its downwardly directed current collector or remover 4 in mechanical and electrical cooperation with the two live contact surfaces, as conductors, rails or strips 4a, 4b associated with road portion 2a1' and a connection 4c to ground.

FIG. 4 shows an electric switching arrangement "K1", in which roadway section or portion after roadway section or portion 2a1, 2a2, 2a3 and 2a1', 2a2' and 2a3', respectively, with their station or stations "s1", "s2", "s3" and "s1'", s2'" and "s3'", respectively, can be activated and made to conduct power as voltage from one and the same controlled power source "III", 42 over switching means and switches 43a, 44a, and 45a for one stretch of a roadway 2a and 43a', 44a' and 45a' along the opposite stretch of a roadway 2b, depending on whether a vehicle 1, 1b will pass along the electrically separate but with longitudinal tracks or grooves coordinated roadway 2a, 2b sections or portions.

For this a number of switches or connecting means for connecting and disconnecting stations "s1", "s2" . . . will be needed, wherein this connecting and disconnecting can occur over stationary sensors (not shown) related to the section or portion of the roadway.

The present invention is based on the prerequisites mentioned above and in accordance with FIG. 5 discloses that current collectors 41, 41', respectively, are intended to be able to slide freely in a direction "P" along a track 51 disposed along a roadway section 2a1.

As may be seen in FIG. 7 that the current collectors 41, 41' are each formed of a main portion 141, 141' made of electrically insulating material and having its lower surface 142, facing the conductor surface or contact surface 4a' which may be subjected to voltage, made flat or at least essentially flat, with an, of electric conductive material 143, 143' consisting of a exposing lower contact surface 144, 149, 149, disposed in said lower surface 142, 142', with the electrically conductive material 143, 143' being adapted to extend through each main portion 141, 141' for forming one or more upper contact surfaces 146, 146' or connecting conductors 146b to the upper surface 145, 145' of the main portion 141, 141'.

The main portion 141, 141' is allotted a surface spread or area extension along the track 51 and has a thickness corresponding to the width of the track 51 with the form of or connecting to the form of a parallelogram or a parallelepiped.

The upper 145 and lower surfaces 142 of the parallelepiped or main portion 141 are adapted to be parallel.

Two or more current collectors 41 and 41' are coordinated for extending along its track 51, having one and the same conductor or contact surface 4a', which may be placed under voltage, and apart from this adapted to form two circuits connected in parallel.

FIG. 7 illustrates a first main portion 41 which is allotted a parallelepipedic shape which deviates from a parallelepipedic shape of a second main portion 41'.

Two or more lower contact surfaces designated 149, 149a, are allotted to said lower surface 142' for a main portion of its current collector 41'.

A resilient or spring means 150 or 150', (FIG. 5) respectively, is adapted to urge the current collector or remover 41, 41' and its main portion 141, 141' as well as its lower contact surface 144 or lower contact surfaces 149a, 149 against the contact surface 4a', which may be subjected to voltage.

Two or more current removers 41, 41' and (41), (41'), respectively, are oriented in parallel and allotted individual ones of two or more parallel tracks 51, 52, according to FIG. 5.

Current collectors 41, 41'; (41), (41') are at least with their lower contact surfaces 144, 149a, 149, made of steel, stainless steel, copper, brass, bronze, aluminum and/or hard coals.

The current collector 41 is allotted at least one lower contact surface and this is shaped as a brush unit, consisting of steel, stainless steel, copper, brass, bronze, aluminum, and/or hard coals.

The conductor rail 4a and its contact surface 4a', which may be placed under voltage, is made of steel, stainless steel, copper, brass, bronze, aluminum, and/or hard coals.

The lower contact surface 144, 149a, 149 is adapted to engage said contact surface 4a', which may exhibit voltage, and arranged at the bottom of the track 51, with an adapted force of between 1 and 15, such as 2-4 $N/cm^2$.

Said two or more contact surfaces 4a', 4b' and its conductors 4a, 4b, may be placed under voltage, are coordinated to the bottom of the respective tracks 51, 52 in a canalization 30, according to FIG. 6.

Said contact surfaces 4a', 4b', which may be placed under voltage, are shaped as rails, strips and/or bands with an upper broad contact surface and with a limited thickness.

Canalization 30 is elongated as a unit and shaped elastic so that it can be bent to a roll.

With reference to FIG. 8 it illustrates two different positions, different in time, for a current collector or remover 41, (41), which here serves the function of a cleaning or cleansing means 80, (80) for cleansing small obstacles from the track 51 however its is here illustrating a solid obstacle 81, (81) stacked to the track 51 when said means 41, (41) strikes said obstacle 81 and when this means 41 is to be able to rotate around a not shown axis of rotation from an initial position (82) to an uplifted position 82' and further to a (not shown) position, where obstacle (81) can be left or ignored.

This cleansing means 80, (80) from loose or solid obstacles 81, (81) is rotatably fastened in its upper are 145, (145) by means of a horizontally disposed axis of rotation 82, 82', which is vertically disposable.

The cleaning means 80 and said axis of rotation 82 are movably attached in a vertical direction towards and away from a chassis allotted to the vehicle, by spring means 150, 150' in FIG. 5, with means being provided with a sloping edge portion 83 disposed in the direction of motion "P", said edge portion 83 in FIG. 8, being allotted a point 83a which may be closely related to said track 51 and its contact surface 4a'.

A surface section 142a for the lower surface 142 is somewhat bent upwards so as to ease the pressure against contact surface 4a' or the bottom of the track 51.

The angular value "a" of said point 83a it chosen to fall within an angular area of 30° to 60°, such as around 45°.

The resilient means or spring means 150, 150' and/or its attachment or point of operation along surface 145, 145' is dimensioned for a limited vertical force against contact surface 4a' or the bottom of the track 51.

Said sloping edge portion 83 is as a cleansing means allotted an angular value "a" with regard to track 51 for throwing small obstacles or water in a direction from the track 51 in consequence of the speed of said edge portion 83 and its angular value "a" along the track 51. Edge portion 83 can be given the shape of one or two propeller surfaces.

Its lower flat surface area 142 is somewhat bent, at reference numeral 142a, upwards from track 51 in connection with and restricted to the length of its point 83a.

The shape of the cleaning means 80 is here adapted to connect to the shape of a current collector or remover 41 and can thus consist of such a current collector as illustrated in accordance with FIG. 8.

Nothing prevents letting the cleansing means 80, (80) be comprised of a current collector 41' protecting unit 41, positioned in front of said current collector 41'.

FIG. 9 illustrates in a side view of an alternative embodiment of a cleaning or cleansing means 41, in the form of a current collector, having a channel 91 adapted for compressed air in the front portion of the current collector 41, counting in the direction of motion, with the purpose of lettering air blow away less polluted particles "p", such as sand or water, from contact surface 4a' before it is to make an electrical contact with its contact surface 144.

FIG. 10 shows a side view of an additional alternative embodiment of a current collector as a cleansing means having channels 91, 91a, 91b adapted for compressed air, with one channel 91 being considered as a connecting channel to a not shown source of compressed air, whereas channels 91a, 91b, etc have the form of a fans with a constant cross section towards contact surface 4a', a diverging cross section towards contact surface 4a', and/or a converging cross section towards contact surface 4a', which is placed under voltage.

FIG. 11 shows a side view of an embodiment of a current collector as a cleansing means having a channel 101 adapted for a low or sub pressure, within the front portion 83a of the current collector, counting in the direction of motion "P", formed for the purpose of sucking away less polluted particles "p", such as sand and/or water from the conductor 4a and its contact surface 4a'.

In FIGS. 9 and 10, respectively, it is proposed that the air ray be generated by compressed air, which in a typical case can have a pressure of 10 bars.

The ray of air has been allotted a high speed, of the magnitude of 100 m/s, and hence it is not of major significance if vehicle 1 moves forward with a velocity up to 30 m/s.

The air jet will clean sand, dust and water effectively before the current collector 41 itself with its sensitive sliding contact 144 arrives.

Compressed air is generated by a compressor in the vehicle and is led by means of flexible hoses to the current collector or remover 41.

With compressed air it may be advantageous to use the latter to have a cleaner hover on a pillow of air so as to thereby minimize wear. Furthermore, the flow of compressed air can be directed frontwards so as to clean off sand, dust and/or water.

Sliding contact 144 is proposed to consist of hard coals and to be of the type which has come to use in current removers (pantographs) for street cars and trains.

FIGS. 12 and 13, respectively, have the purpose of illustrating a current collector or remover 41 having a disc 41a generating forward air turbulences, counting in the direction of motion, said disc 41a being disposed at a small distance over contact surface 4a' and a large distance "D" in the front of the point 83a.

FIGS. 14 to 16 illustrate the transferring of a current from the current collector 41, 41' along the road over two contact means to the vehicle.

The contact means 41 is located behind a cleaner or cleansing means 41' which primarily cleans the track and its contact surface, in a direction of movement "P", from sand, stones, and other objects, as well as from water and snow.

Ice can be melted by using an electric heating.

The cleansing means 41 also protects the contact means 41' from damage if large obstacles "H" are struck. The contacts 41, 41' will be worn by the movement "P" along the contact surface 4a'.

By choosing a material in an insulating portion 41b that is worn out faster than the contact means as a contact surface 41b', the insulating material 41b will at all time have a shape which initially protects the contact means 41b' and fulfill its purpose of initially removing sand, stone, water, and snow from the track 51.

FIG. 14 shows the manner in which the contact means 41 and 41' is disposed within the track 51. (Note that the illustration only shows one of two tracks 51, 52).

By choosing appropriate dimensions it is possible to avoid short-circuiting between the contact and protective ground potential 4c. This means that the height of the displaceable contact means 41 is to be smaller than the distance between an upper edge of the conductor 41 and the lower edge of protective ground potential 4c plus the distance that is needed to handle a required insulation.

As has been shown the contacts means 41, 41' can rotate by a collision with a stationary object "H" so that they leave the track 51 and thus cannot be damaged. This has now been investigated in practical tests and it works as it should. Collision at a speed of 100 km per hour, with an iron bar as an obstacle in the track 51, has been proven not to create any damage.

In contact means 41 with a cleansing means 41b, consisting of electrically insulating and mechanically protective material, the sides of the contact means do not have to be insulated if the upper side to the contact means is disposed lower than the lower edge of the protective ground potential 4c, where a protective cover is grounded in order to guaranty the safety of people.

By choosing a material in the cleansing and protecting means 41b that is worn out faster than the contact means 41b' itself, it is possible to firmly attach the contact means 41b' and the cleansing means 41b to each other.

If the contact means 41b' is subjected to wear the cleansing means 41b will at all time be worn out somewhat more and will fall downwards towards the contact surface 4a' and complete its function.

FIG. 16 is illustrating the uppermost positions of the means 41, 41' after a collision with an obstacle "H".

FIG. 14 is disclosing two current collectors 41, 41' each having a spring arrangement 41a, 41a' and an axis of rotation attached to an arm 14b, its central area 14b' is by an axle 14c, 14c' pivotably secured to the arm 14, which is urged downwardly by a spring arrangement 50.

The invention is of course not limited to the embodiment disclosed above as an example, and it can be subjected to modifications within the frame of the inventive concept illustrated in the following claims.

It should be particularly noted that each shown unit and/or circuit can be combined with each other illustrated unit and/or circuit within the frame of being able to reach the desired technical function.

Some of the following reference numerals have been introduced into FIGS. 1 to 4;

a. 1. Vehicle illustrated as a Ford Model A.
    b. 1b. Truck
    c. 1c. Trailer to truck "b".
    d. 2. Stretch of a roadway
    e. 2a. Roadway in one traveling direction
    f. 2b. Roadway in an opposite traveling direction
    g. 2a1. Roadway section in one traveling direction
    h. 2a1". Roadway section in an opposite direction
    i. 3. Steering equipment
    j. 4. Vehicle related contact means as current remover
    k. 4a. Electrical conductive first rail
    l. 4b. Electrical conductive second rail
    m. 4c. Roadway section related electrical conductor
    n. 4a". Electrical conductive first surface
    o. 4b". Electrical conductive second surface
    p. 5. Vehicle related DC-motor
    q. 6. Support for vehicle related contact means (j)
    r. 7, 8. Auxiliary motors
    s. 10. Control equipment for contact means (j)
    t. 30. Canalization for electric conductors (k, l, m.) and including grooves (u, v.)
    u. 51. First roadway section related groove
    v. 52. Second roadway section related groove
    w. 100. Power control circuit
    x. "I". First vehicle related power source (Generator)
    y. "II". Second vehicle related power source (Battery set.)
    z. "III". Third power source, vehicle external (Ground Station)
    aa. "F". Driver (not shown.)
    bb. "R1". Energy distributing and three power sources controlling circuit
    cc. "R2". Control circuit for energy distribution (Speed control)
    dd. "S". Vehicle and roadways related system

The invention claimed is:

1. A vehicle-related arm-shaped contact means comprising a cleaning means related to an arrangement or system for propelling an electrically propellable vehicle by one or several batteries or a set of batteries along a roadway comprising a plurality of roadway sections, the system comprising:

"a" a plurality of roadway portions for subdividing the roadway into said roadway sections, wherein each one of the roadway sections comprises one or more elongated tracks or slits having conductors introduced therein adapted to be supplied with current and put under voltage, and being connectable via a switch to one or more vehicle-external power sources, including vehicle-external electric stations, for thereby enabling charging of said set of batteries belonging to the vehicle, but primarily driving the vehicle along the roadway and the roadway sections, and "b" one or more driveable or propellable vehicles which may be driven by means of an electric motor or motors, with each of the respective vehicles comprising a control circuit adapted for a necessary distribution of power, adapted for creating required power and/or speed control, wherein said vehicle is provided on its underneath side with contact means displaceable up and down and sideways, in relation to the direction of transportation of the vehicle, wherein said elongated track or tracks and the conductors extend along the roadway and the roadway sections and wherein said contact means is coordinated with a vehicle-related control equipment for creating an adaptation of the contact means so as at least to offer a mechanical and electrical contact with said conductors, wherein coordination between the conductors put under voltage belonging to the roadway section and the contact means of the vehicle occurs via coordinated current collectors, in the form of contact springs, adapted for mechanical and electrical cooperation with respective ones of the conductors put under voltage, wherein the cleaning means is rotatably fastened in an upper area thereof about a horizontally oriented axis of rotation and adapted to clean the track from loose obstacles and/or yield to solid obstacles wherein the cleaning means and said axis of rotation are movably disposed in a vertical direction, by means of a resilient member, wherein the cleaning means is oriented in the direction of transportation of the vehicle and comprises a forwardly directed edge portion, said edge portion comprising a point, which may be brought into contact with the track and the conductor.

2. Cleaning means in accordance with claim 1, wherein the angle of said edge portion with regard to the track is within the range 30° to 60°, preferably around 45°.

3. Cleaning means in accordance with claim 1, wherein the resilient member is dimensioned for a limited vertical force against the contact surface.

4. Cleaning means in accordance with claim 1, wherein the angle of said edge portion with regard to the track is adapted to enable the cleaning means to throw small obstacles and/or water in a direction from the track on the basis of the speed along the track.

5. Cleaning means in accordance with claim 1, wherein a lower flat surface area of the cleaning means is somewhat curved upwardly from the track, beginning from the point.

6. Cleaning means in accordance with claim 1, having a shape corresponding to a current collector.

7. Cleaning means in accordance with claim 1, wherein the current collector is adapted to run freely along a track oriented along the roadway.

8. Cleaning means in accordance with claim 1, wherein the current collector comprises a main portion, made of an electrically insulating material, and having a lower surface facing the conductor or the bottom of the track, wherein said lower surface is at least substantially flat and comprises lower contact surface within said lower surface consisting of an electrically conductive material, wherein the electrically conductive material is adapted to extend through the main portion for forming one or more upper contact surfaces or connecting leads at an upper surface of said main portion.

9. Cleaning means in accordance with claim 8, wherein the main portion substantially has the shape of a parallelogram or a parallelepiped with a surface area spread out along the track and a thickness corresponding to the width of the track.

10. Cleaning means in accordance with claim 9, wherein the upper and lower surfaces of the parallelepiped are parallel.

11. Cleaning means in accordance with claim 1, comprising two or more current collectors adapted to be brought into contact with one and the same conductor, and adapted for forming in parallel connected circuits.

12. Cleaning means in accordance with claim 11, wherein a main portion of the first current collector has the shape of a parallelepiped which differs from a parallelepiped shape of a main portion of the second current collector.

13. Cleaning means in accordance with claim 8, comprising two or more lower contact surfaces disposed at said lower surface of the main portion and adapted to be brought into contact with the conductor at the bottom of the track.

14. Cleaning means in accordance with claim 8, further comprising spring means adapted to urge the main portion and the lower contact surface against the conductor or the bottom of the track.

15. Cleaning means in accordance with claim 1, further comprising two or more current collectors oriented in parallel and each adapted to run in one of two or more parallel tracks.

16. Cleaning means in accordance with claim 8, wherein at least the lower contact surface of the current collector consists of steel, stainless steel, copper, brass, bronze, aluminum and/or hard coals.

17. Cleaning means in accordance with claim 1, wherein the current collector comprises at least one lower contact surface shaped as a brush unit, consisting of steel, stainless steel, copper, brass, bronze, aluminum and/or hard coals.

18. Cleaning means in accordance with claim 1, wherein the lower contact surface is adapted to urge with a force of between 1 and 15 N/cm$^2$ towards the conductor or towards the bottom of the track.

* * * * *